(12) United States Patent
Gebauer et al.

(10) Patent No.: US 10,695,803 B2
(45) Date of Patent: Jun. 30, 2020

(54) PIPETTE CLEANING METHODS AND APPARATUS, NEUTRALIZING LIQUID VESSELS, AND METHODS OF REDUCING CARRYOVER

(71) Applicant: Siemens Healthcare Diagnostics Inc., Tarrytown, NY (US)

(72) Inventors: Carl Gebauer, Granite Springs, NY (US); Moses Peter, Bridgeport, CT (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 28 days.

(21) Appl. No.: 15/549,996

(22) PCT Filed: Feb. 9, 2016

(86) PCT No.: PCT/US2016/017173
§ 371 (c)(1),
(2) Date: Aug. 9, 2017

(87) PCT Pub. No.: WO2016/130563
PCT Pub. Date: Aug. 18, 2016

(65) Prior Publication Data
US 2018/0021820 A1 Jan. 25, 2018

Related U.S. Application Data

(60) Provisional application No. 62/115,952, filed on Feb. 13, 2015.

(51) Int. Cl.
*G01N 1/14* (2006.01)
*G01N 35/10* (2006.01)
(Continued)

(52) U.S. Cl.
CPC .............. *B08B 3/08* (2013.01); *B01L 3/021* (2013.01); *B01L 13/02* (2019.08); *B08B 3/04* (2013.01);
(Continued)

(58) Field of Classification Search
None
See application file for complete search history.

(56) References Cited

U.S. PATENT DOCUMENTS

| 4,406,297 A | 9/1983 | Walton |
| 4,905,526 A | 3/1990 | Magnussen, Jr. et al. |

(Continued)

FOREIGN PATENT DOCUMENTS

| WO | 2014/018754 A1 | 1/2014 |
| WO | 2014/179584 A1 | 11/2014 |

OTHER PUBLICATIONS

PCT International Search Report and Written Opinion dated May 6, 2016 (8 Pages).
Extended EP Search Report dated Feb. 15, 2018 of corresponding European Application No. 16749724.7, 4 Pages.

*Primary Examiner* — Eric W Golightly
*Assistant Examiner* — Arlyn I Rivera-Cordero (57) ABSTRACT

Methods and apparatus configured and adapted to provide less carryover in an automated clinical analyzer are disclosed. The methods include immersing a pipette into a neutralizing liquid vessel and aspirating a neutralizing liquid (e.g., a hypochlorite solution) into an interior of a pipette. The aspirated portion of the neutralizing liquid used to cleanse the pipette interior is then dispensed back into the neutralizing liquid vessel, rather than disposing of the used neutralizing liquid to a waste station. Apparatus and systems configured to carry out the methods are provided, as are other aspects.

17 Claims, 5 Drawing Sheets

(51) Int. Cl.
*B01L 3/02* (2006.01)
*B08B 3/08* (2006.01)
*B08B 3/04* (2006.01)
*B08B 3/10* (2006.01)
*B08B 9/00* (2006.01)

(52) U.S. Cl.
CPC .............. *B08B 3/10* (2013.01); *B08B 9/00* (2013.01); *G01N 1/14* (2013.01); *G01N 35/1004* (2013.01); *B01L 2200/14* (2013.01); *B01L 2200/141* (2013.01); *B01L 2300/0832* (2013.01)

(56) References Cited

U.S. PATENT DOCUMENTS

| | | | |
|---|---|---|---|
| 5,133,373 A | 7/1992 | Hoffman et al. | |
| 5,443,791 A | 8/1995 | Cathcart et al. | |
| 5,827,744 A | 10/1998 | Fose et al. | |
| 2006/0293200 A1 | 12/2006 | Takayama et al. | |
| 2008/0099057 A1 | 5/2008 | Dunfee et al. | |
| 2008/0169005 A1* | 7/2008 | Murawski | A61M 1/168 134/22.1 |
| 2011/0293474 A1 | 12/2011 | Sugimura et al. | |
| 2013/0017621 A1 | 1/2013 | Kaminski | |
| 2013/0255725 A1 | 10/2013 | Mori et al. | |
| 2015/0192601 A1* | 7/2015 | Cohen | G01N 35/1004 134/6 |

\* cited by examiner

PIPETTE CLEANING METHODS AND APPARATUS, NEUTRALIZING LIQUID VESSELS, AND METHODS OF REDUCING CARRYOVER

FIELD

The present invention relates generally to pipette cleaning methods and apparatus used in automated analyte testing systems.

BACKGROUND

Handling of liquid specimens, reagents, and possibly other process fluids is important for the implementation of automated testing methods. Conventionally, liquid specimens, process fluids (e.g., purified water), and liquid reagents are aspirated and/or dispensed within an automated clinical analyzer by using a pipette (sometimes referred to as a "probe"). In certain automated clinical analyzers used to test for the presence of an analyte in a specimen, it may be desirable to precisely aspirate and dispense one or more of the liquids. For example, in some automated clinical analyzers, a portion of a specimen contained in a sample container (such as a test tube, sample cup, vial, or the like) may be aspirated and then transferred into a reaction vessel (e.g., a cuvette) in order to determine a presence of a particular analyte contained therein. As part of this testing process, one or more liquid reagents may be precisely metered into the reaction vessel along with the specimen. In some instances, a dilutant, such as purified water, may be added.

Conventional aspiration systems in such automated clinical analyzers include pipette configurations used for aspirating and dispensing that include a relatively small outer diameter and a small internal passage. The pipette may be coupled to a section of tubing that is, in turn, coupled to one or more pumps (e.g., a piston pump and/or peristaltic pump). The aspiration system, including the pipette and the one or more pumps, is typically primed with purified water known as "liquid backing." The liquid backing, which may be purified water, acts as the vehicle enabling the aspirating and dispensing of the specimen and/or reagent.

After dispense of a specimen or reagent, it is desirable to clean the pipette properly to avoid carryover of any material (e.g., proteins, reagent, or the like) to subsequently conducted tests. Carryover may affect subsequent test results, and, thus, is generally unwanted. Specimen carryover has been addressed in some instances by using disposable tips on the pipette, which may be disposed after a single specimen dispense. Although this method may mitigate carryover, it adds the cost of the disposable tip, the extra process time to install and dispense of the tip, and the housing size must be increased to accommodate an inventory amount of replacement tips.

In some smaller automated clinical analyzers, wash treatments are used to clean the pipette between dispenses of specimen. In such automated clinical analyzers, a volume of liquid backing may be dispensed into a waste station located in the automated clinical analyzer, which may be used to initially clean the internal passage as well as the outside of the pipette. Some analyzers may also include aspirating and dispensing of a bleach solution as part of the cleaning method. Such bleach solution cleaning may follow the specimen dispense. Bleach solution may be provided in an ancillary bleach pack, and may be dispensed to the waste station after its aspiration. However, in many small automated clinical analyzers, space is at a premium. Further, constant reloading of consumable bleach packs may impact process efficiency as well as overall operating costs. In particular, as the consumable bleach pack is drawn down, the depth of bleach solution available to disinfect the outside of the pipette is reduced. At some depth level, other than empty, the consumable bleach pack may be replaced with a full consumable bleach pack to ensure that the pipette is exposed to bleach of a sufficient depth to minimize carryover of residue from the outside of the pipette.

Accordingly, cleaning methods and apparatus that may mitigate carryover, and/or that may reduce an amount of consumable packs that are used, are desired.

SUMMARY

According to a first aspect, a method of cleaning a pipette is provided. The method includes immersing the pipette into a neutralizing liquid vessel containing a neutralizing liquid, aspirating a neutralizing liquid into the pipette, and dispensing the neutralizing liquid back into the neutralizing liquid vessel.

In another method aspect, a method of reducing specimen carryover in an automated clinical analyzer is provided. The method includes providing a pipette including a liquid backing, providing a neutralizing liquid vessel containing a neutralizing liquid in the automated clinical analyzer at a location accessible by the pipette, aspirating a first air segment into the pipette below the liquid backing, immersing the pipette in the neutralizing liquid, aspirating the neutralizing liquid into the pipette below the first air segment from the neutralizing liquid vessel, and following the aspiration, dispensing the neutralizing liquid back into the neutralizing liquid vessel.

In an apparatus aspect, a neutralizing liquid vessel is provided. The neutralizing liquid vessel includes a volume of fresh neutralizing liquid, and a volume of used neutralizing liquid having been previously aspirated from a pipette cleaning operation. The fresh and used are mixed in one compartment of the vessel.

In another apparatus aspect, an aspirating and dispensing apparatus is provided. The aspirating and dispensing apparatus includes a robot, a pipette moveable by the robot, the pipette including a liquid backing, a pump fluidly coupled to the liquid backing, a neutralizing liquid vessel accessible by the pipette, and a controller configured to execute programmed instructions and generate control signals to move the robot and actuate the pump to effectuate: immersion of the pipette in the neutralizing liquid vessel to a desired depth, aspiration of a neutralizing liquid from the neutralizing liquid vessel into the pipette below the liquid backing, and dispensing of the neutralizing liquid back into the neutralizing liquid vessel.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

BRIEF DESCRIPTION OF THE DRAWINGS

The drawings, described below, are for illustrative purposes only and are not necessarily drawn to scale. The drawings are not intended to limit the scope of the invention in any way.

DESCRIPTION

For at least the above-described reasons, methods and apparatus configured to aspirate and dispense liquids in automated testing where liquid carryover mitigation is provided are desirable. It has been discovered by the inventor herein that existing cleaning method may be costly on multiple levels. First, the existing cleaning method results in much waste, as witnessed by discarding cleaning solution packs even though not fully empty. Further, the additional downtime for changing out such cleaning solution packs may be costly. Moreover, if the entire outside of the pipette is not cleaned, this may possibly result in specimen carryover, in that some proteins may be provided as residue on the outside of the pipette. Presence of such protein residues might possibly affect the accuracy of subsequent testing.

In view of the foregoing problems, the present invention, in one aspect, provides methods and apparatus adapted to provide improved pipette cleaning, and, thus, reduced propensity for specimen or reagent carryover. The improved cleaning is accomplished according to embodiments of the invention by lowering the pipette to a sufficient depth in a consumable neutralizing liquid vessel (e.g., a cleaning solution pack), aspirating a volume of a neutralizing liquid into the pipette from the neutralizing liquid vessel, and then dispensing the neutralizing liquid back into the cleaning solution pack after aspiration. Although counter-intuitive at first, it has been discovered by the inventor that if the neutralizing solution is sufficiently chemically active to render any residue on the pipette from the previous aspirate and dispense as inactive, then the depositing back to the neutralizing liquid vessel does not functionally contaminate the neutralizing liquid in the neutralizing liquid vessel. For example, if the neutralizing liquid has a sufficiently high molarity of hypochlorite, any protein residuals will be oxidized and rendered inactive towards the assay. Furthermore, using an embodiment of the present method, a depth of the neutralizing liquid vessel may not be appreciably lowered over time, allowing the neutralizing liquid vessel to be replaced with less frequency.

These and other aspects and features of the invention will be described with reference to FIGS. 1-5 herein.

Figure 1:
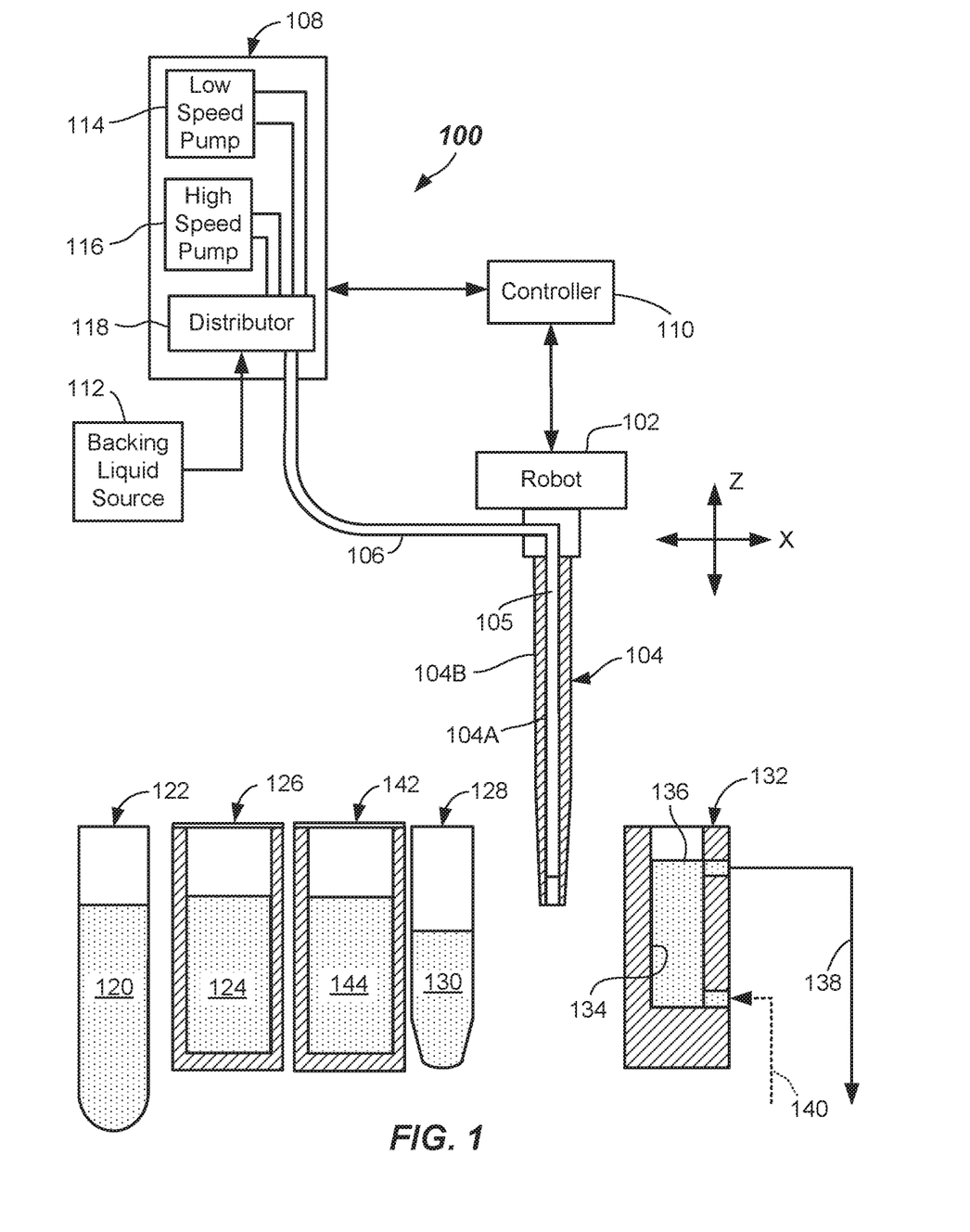
FIG. 1 illustrates a partially cross-sectioned side view of an aspirating and dispensing apparatus adapted to carry out inventive methods according to one or more embodiments.

As represented in FIG. 1, a configuration of an aspirating and dispensing apparatus 100 configured to carry out one or more embodiments of the present invention is shown. The aspirating and dispensing apparatus 100 includes a robot 102 having a pipette 104 coupled thereto. The pipette 104 may be a slender conventional pipette having an interior 104A and an exterior 104B. The robot 102 may be any suitable robot adapted to move the pipette 104 to and from defined process locations. Robot 102 may move in the Z direction, X and Z as shown, Z and Y (Y being into and out of the paper), or even X, Y and Z in some embodiment. Robot may be an R, theta robot in other embodiments. A section of tubing 106 may be fluidly coupled to the interior 104A of the pipette 104 and that tubing 106 is, in turn, fluidly coupled to an aspirator/dispenser unit 108. Tubing 106 may be a flexible polymer, such as polytetrafluoroetheylene (PTFE), for example. The robot 102 and aspirator/dispenser unit 108 may be operated by control signals from a controller 110 to aspirate and/or dispense fluids such as liquid specimen, liquid reagent, and backing liquid (e.g., purified de-ionized water).

The aspirator/dispenser unit 108 may include any configuration adapted to aspirate and dispense liquids. The aspirator/dispenser unit 108 may include one or more pumps, distributors, valves, filters, sensors, or other fluid-conveying components. For example, the aspirator/dispenser unit 108 may include two pumps as shown in FIG. 1. A high speed pump 116 may be coupled to a backing liquid source 112 by a distributor 118. A backing liquid 105 from the backing liquid source 112 (e.g., a reservoir of purified de-ionized water) may be provided into the tubing 106 and interior 104A of the pipette 104. Backing liquid 105 may serve as the vehicle for aspirating and dispensing specimen, aspirating and dispensing one or more reagents or buffers, but also may be used to provide diluent to the various reaction vessels, as desired. Furthermore, the backing liquid 105 may be used to flush any residue of specimen and/or reagent remaining in the interior 104A from a previous aspiration and dispense sequence during a pipette cleaning sequence.

In conventional operation, a low speed pump 114 may be used to carefully meter and dispense specimen 120 from the specimen container 122 to a reaction vessel 128 and low speed pump 114 may also be used to carefully meter the reagent 124 from a reagent container 126 (e.g., a reagent pack) to a reaction vessel 128. During some conventional sequences, the backing liquid 105 may be dispensed from the interior 104A of the pipette 104 to the reaction vessel 128 as a diluent by the use of the either the low speed pump 114 or the high speed pump 116, for example. This prior art method provides a combination 130 of reagent 124, specimen 120, and diluent within the reaction vessel 128. The low speed pump 114 and high speed pumps 116 may be operated and driven by utilizing stepper motors. A mixing operation may start after initial reagent addition and/or after backing liquid addition to mix the various components to a desired level. Mixing may be by any suitable conventional method.

After the specimen dispense, according to a prior art method, the pipette 104 may undergo a first cleaning phase. The first cleaning phase involves inserting the pipette 104 into a reservoir 134 of a waste station 132 to a desired depth. Waste station 132 as used herein is any location that is conventionally used to discard waste material, i.e., cleaning solutions, bleach-containing liquids, and the like. The reservoir 134 may be filled to a desired level with a cleaning liquid 136 (e.g., water, optionally including a cleaning solution 140, or a combination thereof). This immerses the pipette 104 in the cleaning liquid 136 to a desired depth, after which the backing liquid 105 may be dispensed from the interior 104A of the pipette 104 and into the waste station 132 by the use of the high speed pump 116. This pumping flushes the cleaning liquid 136 and the backing liquid 105 from the reservoir 134 and out through a drain 138. Drain 138 may be any suitable exit, conduit or passage enabling removal of waste liquid from the reservoir 134. Along with the dispensed cleaning liquid 136 and backing liquid 105, a majority of loosely-adhered proteins of the specimen 120 or residue of reagent may be removed.

In prior art methods, after the first phase of cleaning is completed, the pipette 104 may undergo a second cleaning phase. Second cleaning phase involves lowering the pipette 104 into a neutralizing liquid vessel 142 to a desired depth in the neutralizing liquid 144 (e.g., a bleach-containing liquid), aspirating some of that neutralizing liquid 144 into the pipette 104 and then dispensing the neutralizing liquid 144 into the waste station 132. Neutralizing liquid 144 may be a hypochlorite solution comprising greater than 0.14 moles/liter of hypochlorite. Neutralizing liquid 144 may comprise hypochlorite, which may have a pH of greater than about 10 pH in order to help the stability of the hypochlorite, for example. Other pH values may be used. Neutralizing liquid 144 may include a surfactant that is stable in the hypochlorite solution. The surfactant may be an alkyldiphenyloxide disulfonate surfactant, for example, and may be provided at about 0.1% by volume. Other suitable surfactants may be used.

As explained above, over time, as additional cleaning operations take place on the pipette 104, the neutralizing liquid 144 in the neutralizing liquid vessel 142 will be depleted. At some point, when the level is so low that an appreciable length of the pipette 104 may not being immersed, or a sufficient volume may not be aspirated; the neutralizing liquid vessel 142 will be replaced or refilled.

Figure 2:
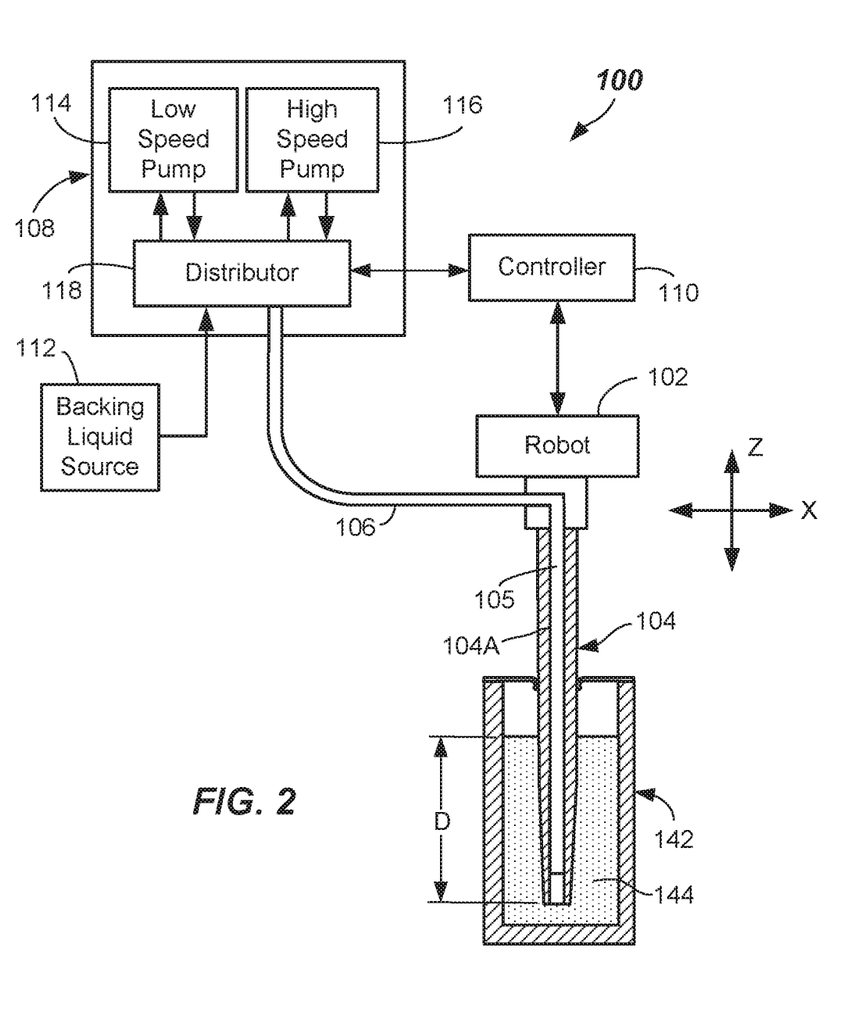
FIG. 2 illustrates a partially cross-sectioned side view of an aspirating and dispensing apparatus including a pipette immersed in a neutralizing liquid of a cleaning solution pack according to one or more embodiments.
Figure 3:
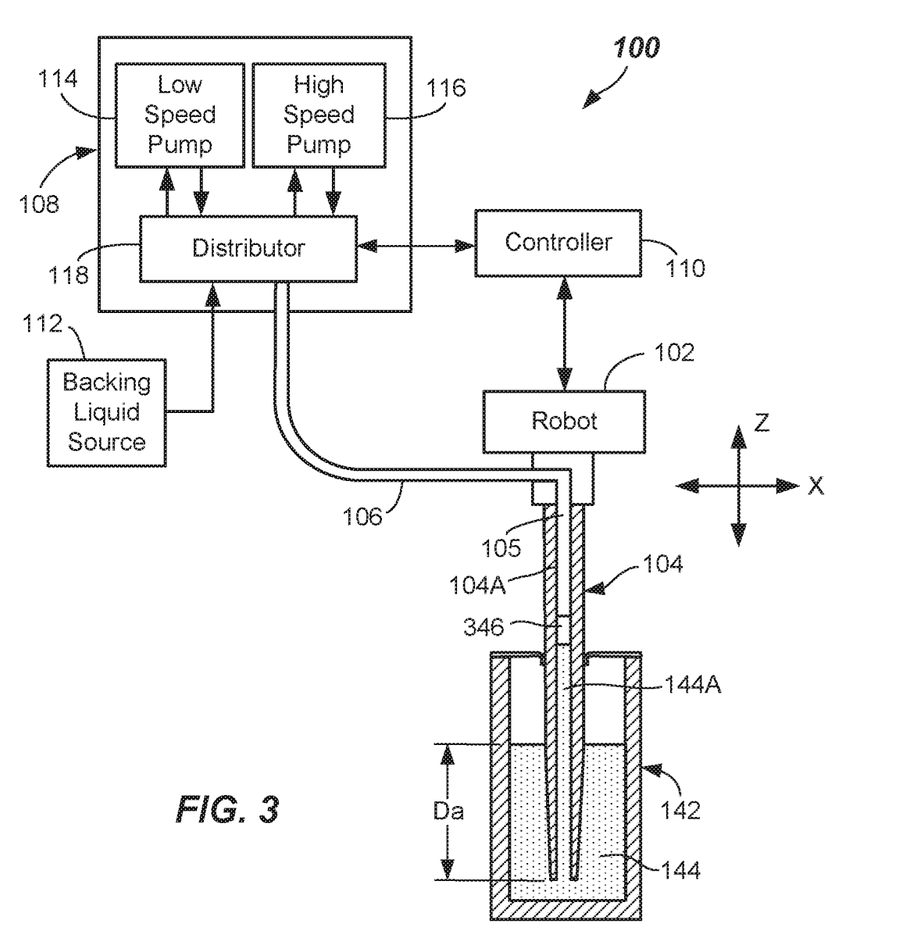
FIG. 3 illustrates a partially cross-sectioned side view of an aspirating and dispensing apparatus including a pipette aspirating a volume of a neutralizing liquid from a cleaning solution pack according to one or more embodiments.
Figure 4:
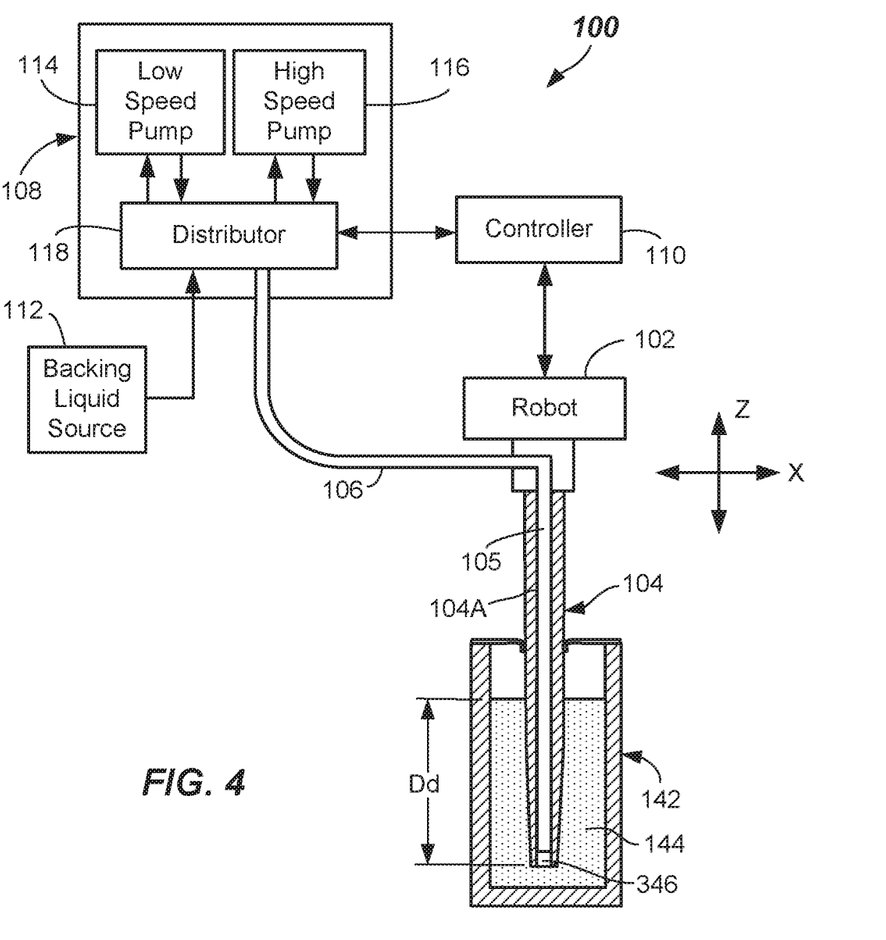
FIG. 4 illustrates a partially cross-sectioned side view of an aspirating and dispensing apparatus including a pipette dispensing the aspirated volume of neutralizing liquid back into the cleaning solution pack, but not the liquid backing according to one or more embodiments.

According to embodiments of the present invention, rather than discard the neutralizing liquid 144, as in the prior art, the pipette 104 may perforate a sealing film on a top of the neutralizing liquid vessel 142 and may be immersed in the neutralizing liquid vessel 142 to a desired depth "D" as shown in FIG. 2. Desired depth "D" depth may be at least about 30 mm, for example. Other depths may be used. The neutralizing liquid 144 contacts the exterior 104B of the pipette 104, which was previously exposed to specimen 120. The neutralizing liquid 144 is then aspirated into the interior 104A of the pipette 104 to a depth Da, which is less than desired depth D, as shown in FIG. 3 (aspirated portion designated as 144A). Sufficient neutralizing liquid 144 may be aspirated into the pipette 104 to allow the neutralizing liquid 144 to contact all portions of the interior 104A previously in contact with the specimen 120. After that, the aspirated portion 144A of the neutralizing liquid 144 is simply dispensed back into the neutralizing liquid vessel 142, as shown in FIG. 4. Thus, the depth "Dd" after the aspirated portion is dispensed back into the neutralizing liquid vessel 142 is substantially the same as depth "D" before the aspiration.

An air separator 346 may be included to separate the backing liquid 105 from the aspirated portion 144A. In the dispense operation, the aspirated portion 144A is dispensed back into the neutralizing liquid vessel 142 and a part of the air separator 346 may be dispensed as well, but no portion of the backing liquid 105 should be dispensed. According to embodiments, the volume of the aspirated portion 144A may be between about 50 μL and about 650 μL. The volume of the neutralizing liquid vessel 142 may be about 50 mL or more. The volume of the air separator 346 may be between about 2 μL and about 50 μL. However, other volumes of the air separator 346 may be used. Neutralizing liquid 144 operates to react with any residue of specimen 120 on the pipette 104 and render the residue inactive. In reacting with residue of the specimen 120, an equivalent small portion of the active component of the neutralizing liquid 144 is lost in the reaction. However, a strength of the neutralizing liquid 144 remains sufficient to react with the residue of the specimen 120 for many subsequent numbers of cleaning operations (see below).

In this manner, the level of the neutralizing liquid 144 in the neutralizing liquid vessel 142 is not lowered appreciably. Accordingly, the neutralizing liquid vessel 142 may not need to be replaced so frequently. After the immersion in the neutralizing liquid 144, the pipette 104 is now readied for another specimen aspirate and dispense sequence or, optionally, an aspirate and dispense of a reagent 124 from the reagent container 126.

Although the immersion in the neutralizing liquid 144 is described as taking place after the cleaning sequence is carried out in the waste station 132, in some embodiments the operation of aspirating the aspirated portion 144A, and then dispensing the aspirated portion 144A back into the neutralizing liquid vessel 142, may take place before such cleaning sequence at the waste station 132. Likewise, in cases where other liquids are aspirated and dispensed, such as liquid reagents, and where a cleaning sequence is undertaken to render reagent residue as inactive using a neutralizing liquid 144, then the present method may be employed equally well to cleanse the pipette 104 after aspirating and dispensing reagent. In this instance, the pipette 104 with reagent residue will be immersed into the neutralizing liquid vessel 142, a volume (e.g., aspirated portion) of the neutralizing liquid 144 will be aspirated into the interior 104A, and then will be dispensed back into the neutralizing liquid vessel 142.

Figure 5:
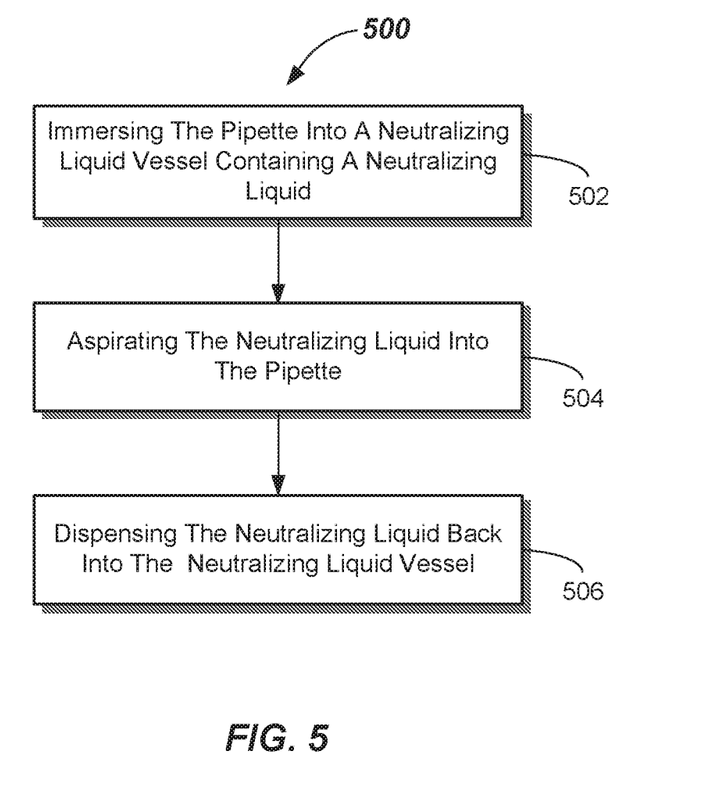
FIG. 5 illustrates a flowchart of a method of cleaning a pipette according to embodiments.

FIG. 5 illustrates a method of cleaning a pipette in an automated clinical analyzer. The method 500 includes, in 502, immersing the pipette (e.g., pipette 104) into a neutralizing liquid vessel (e.g., neutralizing liquid vessel 142) containing a neutralizing liquid (e.g., neutralizing liquid 144), and aspirating the neutralizing liquid (e.g., neutralizing liquid 144) into the pipette in 504. The method 500 further includes, in 506, dispensing the neutralizing liquid (e.g., neutralizing liquid 144) back into the neutralizing liquid vessel (e.g., neutralizing liquid vessel 142). This aspiration and dispense in 504, 506 may be repeated over and over. In some embodiments, the pipette 104 may be immersed in the neutralizing liquid 144 of the neutralizing liquid vessel 142 (e.g., a single cleaning solution pack) for at least 750 successive cleaning operations, or even for at least 1,000 successive cleaning operations, or even for at least 1,500 successive cleaning operations, or more. Thus, it should be apparent that the volume of neutralizing liquid 144 is re-aspirated and re-dispensed. As such, the neutralizing liquid vessel 142 includes a volume of neutralizing liquid 144 that is "used" having been previously aspirated from and dispensed to the neutralizing liquid vessel 142, together with volume of neutralizing liquid 144 that is "fresh." After a dispense, a small amount of the dispensed specimen 120 may be left behind as residue on the pipette 104. This specimen residue may be approximately 6 uL per dispense. As such, the neutralizing liquid vessel 142 may continue to be used until the neutralizing liquid no longer has the ability to effectively neutralize the specimen reside. In some embodiments, a volume equivalent of greater than 1,500 specimen aspirations may be accomplished before the neutralizing liquid no longer has the ability to effectively neutralize. At that point, the neutralizing liquid vessel 142 may be replaced or refilled. In any event, this amounts to greater than about 3 times the number of aspirates and dispenses that may be undertaken by like-sized vessels using the prior art method of aspirating bleach-containing liquid and then disposing that liquid to a waste station 132.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of reducing specimen carryover in an automated clinical analyzer, comprising:
    providing a pipette including a liquid backing;
    providing a neutralizing liquid vessel containing a neutralizing liquid in the automated clinical analyzer at a location accessible by the pipette;
    using the pipette to dispense a specimen or reagent;
    aspirating a first air segment into the pipetting below the liquid backing;
    immersing the pipette in the neutralizing liquid;
    aspirating the neutralizing liquid into the pipette below the first air segment from the neutralizing liquid vessel;
    following the aspiration, dispensing the neutralizing liquid back into the neutralizing liquid vessel; and
    reusing the neutralizing liquid dispensed back into the neutralizing liquid vessel for subsequent immersions and aspirations of the pipette or another pipette after at least one subsequent use of the pipette or another pipette to dispense a specimen or reagent.

2. The method of claim 1, wherein no backing fluid is dispensed into the neutralizing liquid vessel when dispensing the neutralizing liquid back into the neutralizing liquid vessel.

3. A method of cleaning a pipette, comprising:
    immersing the pipette into a neutralizing liquid vessel containing a neutralizing liquid after a first aspirate and dispense sequence of a specimen or reagent by the pipette;
    aspirating the neutralizing liquid into the pipette;
    dispensing the neutralizing liquid back into the neutralizing liquid vessel, and
    reusing the neutralizing liquid dispensed back into the neutralizing liquid vessel for subsequent immersions and aspirations of the pipette or another pipette after at least a second aspirate and dispense sequence of a specimen or reagent by the pipette or after an aspirate and dispense sequence of a specimen or reagent by the other pipette.

4. The method of claim 3, wherein the neutralizing liquid is aspirated below a liquid backing.

5. The method of claim 3, wherein the neutralizing liquid comprises a solution comprising greater than 0.14 moles/liter of hypochlorite.

6. The method of claim 3, wherein at least a portion of the neutralizing liquid is re-aspirated and re-dispensed into the neutralizing liquid vessel.

7. The method of claim 3, wherein the pipette aspirates both specimen and reagent.

8. The method of claim 3, wherein the pipette is immersed in the same neutralizing liquid of the neutralizing liquid vessel for at least 750 successive cleaning operations.

9. The method of claim 3, wherein the pipette is immersed in the same neutralizing liquid of the neutralizing liquid vessel for at least 1,000 successive cleaning operations.

10. The method of claim 3, wherein the neutralizing liquid operates to react with any specimen residue on the pipette and render the specimen residue inactive.

11. The method of claim 3, wherein the pipette perforates a sealing film on a top of the neutralizing liquid vessel.

12. The method of claim 3, wherein a volume of an aspirated portion of the neutralizing liquid is between about 50 μL and about 650 μL.

13. The method of claim 3, wherein the neutralizing liquid comprises a solution comprising hypochlorite.

14. The method of claim 13, wherein the neutralizing liquid includes a surfactant.

15. The method of claim 3, comprising:
    providing a liquid backing within the pipette; and
    aspirating an air separator between the liquid backing and the neutralizing liquid.

16. The method of claim 15, wherein the air separator has a volume of between about 2 μL and about 50 μL.

17. An aspirating and dispensing apparatus, comprising:
    a robot;
    a pipette moveable by the robot, the pipette including a liquid backing;
    a pump fluidly coupled to the liquid backing;
    a neutralizing liquid vessel accessible by the pipette; and
    a controller configured to execute programmed instructions and generate control signals to move the robot and actuate the pump to effectuate:
        immersion of the pipette in the neutralizing liquid vessel to a desired depth;
        aspiration of a neutralizing liquid from the neutralizing liquid vessel into the pipette below the liquid backing;
        dispensing of the neutralizing liquid back into the neutralizing liquid vessel; and
        reusing the neutralizing liquid dispensed back into the neutralizing liquid vessel for subsequent immersions and aspirations of the pipette or another pipette after at least one subsequent dispensing of a specimen or a reagent from the pipette or another pipette.

* * * * *